(12) United States Patent
Meng et al.

(10) Patent No.: US 7,972,537 B2
(45) Date of Patent: Jul. 5, 2011

(54) CARBON NANOTUBE-CONDUCTIVE POLYMER COMPOSITE

(75) Inventors: Chui-Zhou Meng, Beijing (CN); Chang-Hong Liu, Beijing (CN); Shou-Shan Fan, Shenzhen (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 159 days.

(21) Appl. No.: 12/317,147

(22) Filed: Dec. 19, 2008

(65) Prior Publication Data

US 2010/0019209 A1 Jan. 28, 2010

(30) Foreign Application Priority Data

May 14, 2008 (CN) .......................... 2008 1 0067169

(51) Int. Cl.
*H01B 1/04* (2006.01)
*H01B 1/12* (2006.01)
(52) U.S. Cl. ........................ 252/511; 252/510
(58) Field of Classification Search .................. 252/511, 252/510
See application file for complete search history.

(56) References Cited

U.S. PATENT DOCUMENTS

| | | | |
|---|---|---|---|
| 6,599,446 B1 * | 7/2003 | Todt et al. ...................... | 252/511 |
| 6,800,155 B2 * | 10/2004 | Senecal et al. ................ | 156/62.4 |
| 6,936,653 B2 * | 8/2005 | McElrath et al. ............. | 524/496 |
| 6,949,159 B2 * | 9/2005 | Friend et al. ................... | 156/242 |
| 6,991,750 B2 * | 1/2006 | Majumdar et al. ............ | 252/500 |
| 7,001,556 B1 * | 2/2006 | Shambaugh ............... | 264/210.6 |
| 7,008,563 B2 * | 3/2006 | Smalley et al. ............... | 252/511 |
| 7,022,776 B2 * | 4/2006 | Bastiaens et al. ............. | 525/391 |
| 7,118,693 B2 * | 10/2006 | Glatkowski et al. .......... | 252/502 |
| 7,153,903 B1 * | 12/2006 | Barraza et al. ................ | 524/847 |
| 7,354,532 B2 * | 4/2008 | Hsu et al. ....................... | 252/511 |
| 7,455,793 B2 * | 11/2008 | Hsu et al. ....................... | 252/500 |
| 7,462,656 B2 * | 12/2008 | Keulen et al. .................. | 523/351 |
| 2003/0077515 A1 * | 4/2003 | Chen et al. ................... | 429/231.8 |
| 2003/0213939 A1 | 11/2003 | Narayan et al. | |
| 2006/0115640 A1 * | 6/2006 | Yodh et al. ..................... | 428/221 |
| 2007/0104947 A1 * | 5/2007 | Shambaugh .................. | 428/359 |
| 2008/0042110 A1 * | 2/2008 | Kamakura et al. ............ | 252/511 |
| 2008/0145570 A1 | 6/2008 | Zhang et al. | |
| 2009/0181239 A1 * | 7/2009 | Fan et al. ....................... | 428/327 |
| 2010/0078194 A1 * | 4/2010 | Bhatt et al. .............. | 174/110 SR |
| 2010/0104808 A1 * | 4/2010 | Fan et al. ....................... | 428/143 |
| 2010/0178487 A1 * | 7/2010 | Arai et al. .................. | 428/300.1 |
| 2011/0049437 A1 * | 3/2011 | Crain et al. .................... | 252/511 |

FOREIGN PATENT DOCUMENTS

| | | |
|---|---|---|
| CN | 101121791 | 2/2008 |
| JP | 2005521782 | 7/2005 |

* cited by examiner

*Primary Examiner* — Douglas McGinty
(74) *Attorney, Agent, or Firm* — D. Austin Bonderer

(57) ABSTRACT

A carbon nanotube-conductive polymer composite includes a plurality of CNTs and conductive polymer fibers. The CNTs are connected with each other to form a network. The conductive polymer fibers adhere to surfaces of the CNTs and/or tube walls of the CNTs.

18 Claims, 5 Drawing Sheets

CARBON NANOTUBE-CONDUCTIVE POLYMER COMPOSITE

RELATED APPLICATIONS

This application is related to commonly-assigned applications: U.S. patent application Ser. No. 12/487,284, entitled, "METHOD FOR MAKING CARBON NANOTUBE-CONDUCTIVE POLYMER COMPOSITE", filed Jun. 18, 2009; U.S. patent application Ser. No. 12/487,291, entitled "METHOD FOR MAKING A CARBON NANOTUBE-CONDUCTIVE POLYMER COMPOSITE", filed Jun. 18, 2009. The disclosures of the above-identified applications are incorporated herein by reference.

BACKGROUND

1. Field of the Disclosure

The disclosure relates to a carbon nanotube/polymer composite, and particularly to a carbon nanotube-conductive polymer composite.

2. Description of Related Art

Carbon nanotubes (CNTs) have a high Young's modulus, high thermal conductivity, and high electrical conductivity, among other properties, making them an ideal composite material supplement. It has thus been suggested that CNT composite materials can play an important role in fields such as microelectronics, material science, biology, and chemistry, etc.

The conventional carbon nanotube-conductive polymer composite includes a plurality of CNTs with conductive polymer pellets distributed in the gaps among the CNTs. The carbon nanotube-conductive polymer composite is applicable in the field of super capacitors, in solar cell electrodes, in which charging and discharging of the conductive polymer pellets contract and expand conductive polymer pellet volume. The spatial structures of CNTs may alleviate the volume contraction and expansion of the carbon nanotube-conductive polymer composite caused by the mentioned volume contraction and expansion of the conductive polymer pellet. Moreover, the carbon nanotube-conductive polymer composite's high electrical conductivity may reduce the resistance of the carbon nanotube-conductive polymer composite. Therefore, the carbon nanotube-conductive polymer composite provides favorable electrical conductivity and high specific electric capacity (exceeding 200 Farad/grams). However, in conventional technology, CNTs of the carbon nanotube-conductive polymer composite require dispersal in strong oxidized acid, such as sulfuric or nitric acid and surfactant, followed by electrochemical reaction with the conductive polymer pellets, with the result that carbon nanotube-conductive polymer composite film is finally obtained on the working electrode. Using the strong acid solution to disperse the CNTs destroys the CNTs. Additionally, since the surfactant is not easily removed from the carbon nanotube-conductive polymer composite, performance of the carbon nanotube-conductive polymer composite is negatively affected. Moreover, because CNTs are easy to reunite, in the conventional technology, the CNTs cannot form a good electric conductive network. Considerable spacing between adjacent CNTs increases resistance of the carbon nanotube-conductive polymer composite and decreases specific electric capacity thereof, adversely affecting electrical conductivity and heat conduction of the CNTs be fully performed.

What is needed, therefore, is a carbon nanotube-conductive polymer composite with low internal resistances and excellent specific electric capacity properties.

SUMMARY

A carbon nanotube-conductive polymer composite includes a plurality of CNTs and conductive polymer fibers. The CNTs are connected with each other to form a network. The conductive polymer fibers adhere to surfaces of the CNTs.

Other novel features and advantages of the present carbon nanotube-conductive polymer composite will become more apparent from the following detailed description of the present embodiments, when taken in conjunction with the accompanying drawings.

BRIEF DESCRIPTION OF THE DRAWINGS

Many aspects of the present carbon nanotube-conductive polymer composite can be better understood with reference to the following drawings. The components in the drawings are not necessarily drawn to scale, the emphasis instead being placed upon clearly illustrating the principles of the present carbon nanotube-conductive polymer composite.

Figure 1:
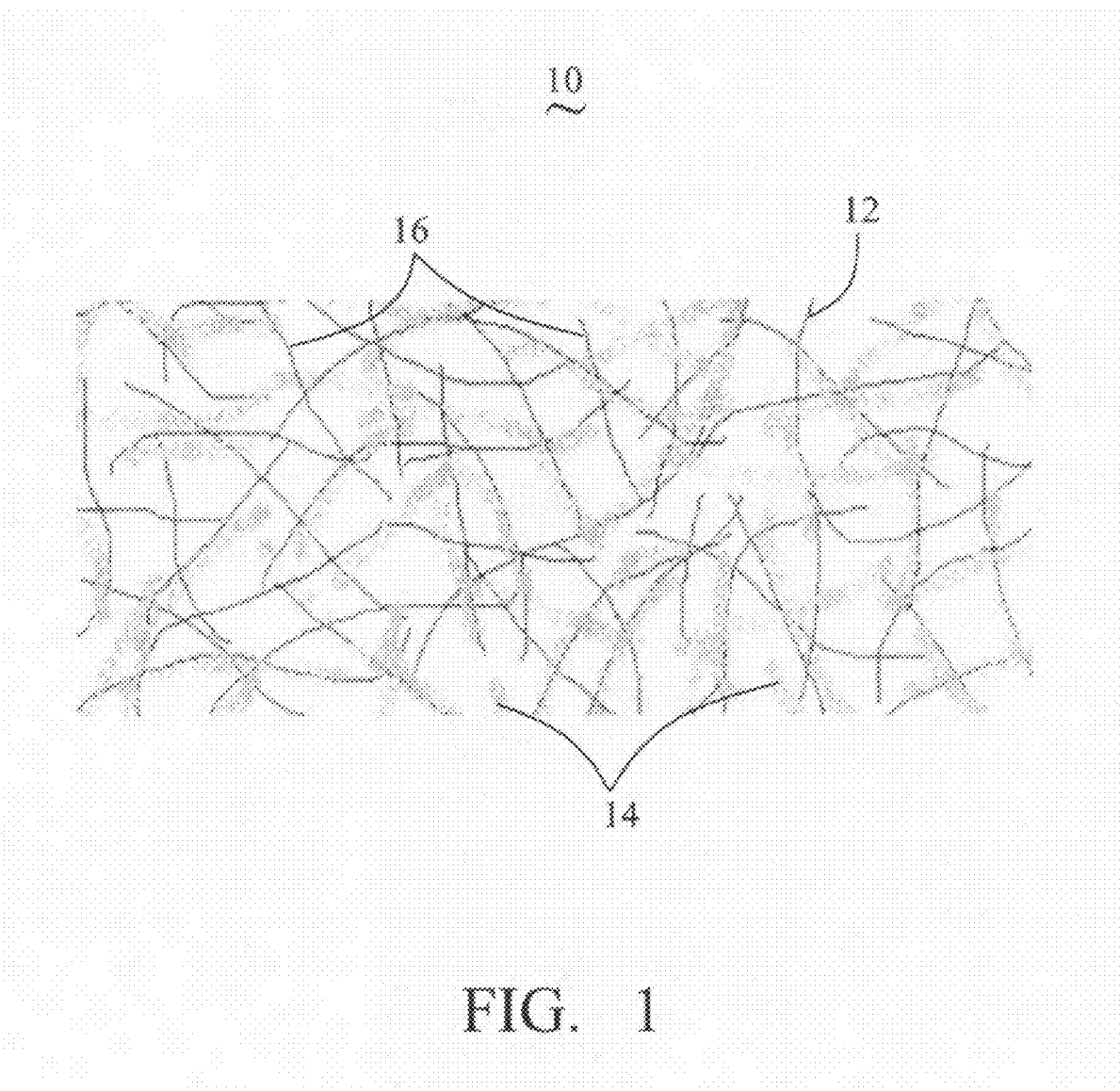
FIG. 1 is a schematic view of a carbon nanotube-conductive polymer composite including disordered CNTs in accordance with a first embodiment.

Corresponding reference characters indicate corresponding parts throughout the several views. The exemplifications set out herein illustrate at least one embodiment of the present carbon nanotube-conductive polymer composite, in one form, and such exemplifications are not to be construed as limiting the scope of the invention in any manner.

DETAILED DESCRIPTION

Reference will now be made to the drawings to describe various embodiments of the present carbon nanotube-conductive polymer composite, in detail.

Referring to FIG. 1, a carbon nanotube-conductive polymer composite 10 includes a number of CNTs 12 and conductive polymer fibers 14. The CNTs are connected with each other to form a carbon nanotube network 16. The conductive polymer fibers 14 adhere to surfaces of the CNTs. The carbon nanotube network 16 forms a skeleton to which the conductive polymer fibers 14 adhere. The CNTs 12 and conductive polymer fibers 14 are uniformly distributed in the carbon nanotube-conductive polymer composite 10.

In the present embodiment, the CNTs 12 of the carbon nanotube network 16 are disordered or in isotropic arrangement. The disordered CNTs 12 are attracted and packed together closely by van Der Waals force, attaching to one another to form a uniformly distributed structure. The isotropic CNTs 12 are attracted by van Der Waals force parallel to the surface of the carbon nanotube network 16.

The CNTs can be single-walled, double-walled, or multi-walled, or a combination thereof. Diameters of the single-walled CNTs are approximately from 0.5 nanometers (nm) ~50 nanometers (nm). Diameters of the double-walled CNTs are approximately from 1.0 nm~50 nm. Diameters of the multi-walled CNTs are approximately from 1.5 nm~50 nm. Lengths of CNTs are approximately from 100 nm~10 millimeters (mm).

The conductive polymer fibers 14 can be polyaniline, polypyrrole, polythiophene, polyacetylene, polyparaphenylene, poly phenylene vinylene, or any combination thereof. Lengths of the conductive polymer fibers 14 are approximately from 100 nm~10 mm. Diameters of the conductive polymer fibers 14 are from about 30 nm to about 120 nm. The mass percent of the conductive polymer fibers 14 in the carbon nanotube-conductive polymer composite 10 is in the approximate range 20%~80%. It is to be understood that lengths of the conductive polymer fibers 14 are similar to those of the CNTs 12, which is advantageous to mutual adsorption and uniform distribution thereof.

Figure 2:
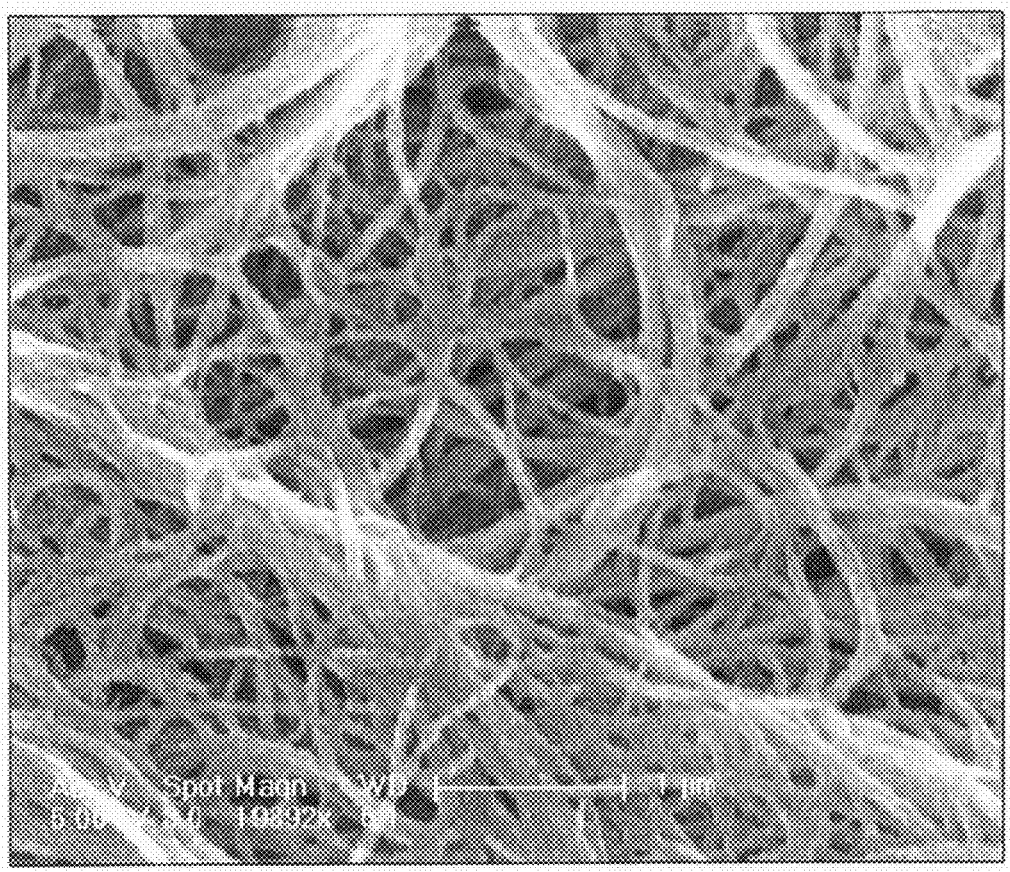
FIG. 2 is a scanning electron microscope (SEM) picture of a carbon nanotube/polyaniline composite.

FIG. 2 shows a Scanning Electron Microscope (SEM) image of a first embodiment of the carbon nanotube/polyaniline composite. The carbon nanotube/polyaniline composite uses polyaniline fibers as conductive polymer fibers 14 to mutually compound with the disordered carbon nanotube network 16 and adhere thereto. The diameters of the polyaniline fibers are from about 30 nm to about 120 nm, with lengths of about 500 nm. For convenient survey of specific electric capacity, the carbon nanotube/polyaniline composite is sliced into two circles of about 13 mm diameter, thickness of about 55 microns, and mass of about 3.95 milligrams (mg).

Figure 3:
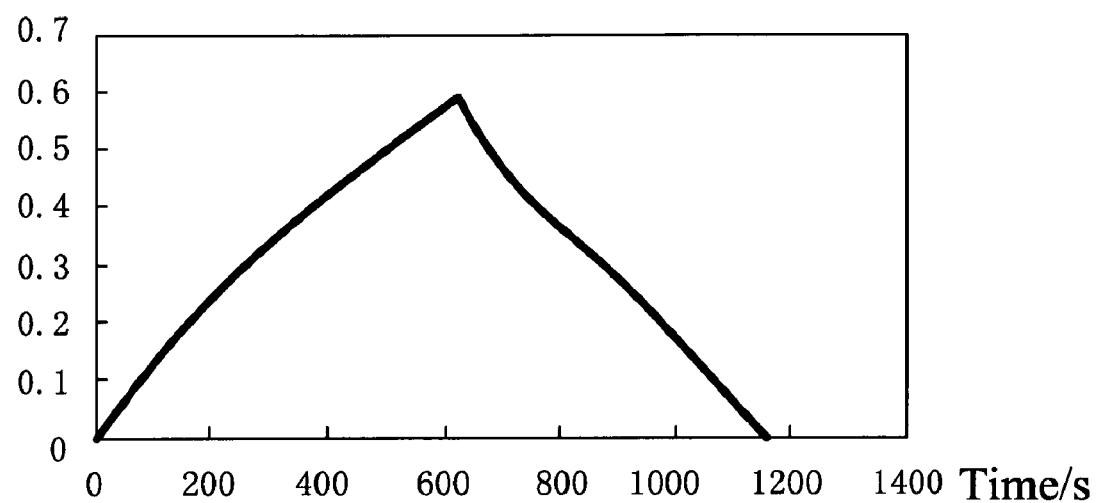
FIG. 3 is a charging and discharging diagram of curves of FIG. 2.

Constant current charging and discharging survey with Potentiostat/Galvanostat model 273A electrochemistry workstation is conducted on the carbon nanotube/polyaniline composite slice with disordered CNTs of the first embodiment. CELGARD membrane paper (polyethylene film) is used as a diaphragm, 1 mol/L sulfuric acid solution is used as electrolyte, with constant current of 1 milliamperes (mA), and voltage is between 0 to about 0.6 volts (V). The measurement data curve as shown in FIG. 3, with carbon nanotube/polyaniline composite discharging time about 550 s.

In the described discharging process of the carbon nanotube/polyaniline composite slice, the total electric charge through the circuit equals that saved in the carbon nanotube/polyaniline composite, as:

$$C \times \Delta U = I \times t \quad (1)$$

wherein C is electric capacity of the electric circuit, $\Delta U$ the loss of voltage in the electric circuit, I the electric current of the electric circuit, and t discharging time.

Each carbon nanotube/polyaniline composite slice has electric capacity C', therefore, the entire electric capacity of charging electric circuit is:

$$\frac{1}{C'} + \frac{1}{C'} = \frac{1}{C}, \quad (2)$$

and $$C' = 2C$$

the specific electric capacity of each carbon nanotube/polyaniline composite slice specific capacity quantity $C_s$ is:

$$C_S = \frac{C'}{m} \quad (3)$$

wherein m is the mass of each carbon nanotube/polyaniline composite material.

Formulae (1) and (2) will substitute the formula separately in (3), resulting in:

$$C_S = \frac{2I \times t}{m \times \Delta U} \quad (4)$$

In the present embodiment, the electric current is 1 mA, the discharging time is 550 s, the mass of each carbon nanotube/polyaniline composite slice is 3.95 milligrams (mg), the voltage is 0.6V, with this data input into formula (4), obtaining specific electric capacity for each carbon nanotube/polyaniline composite of about 464 Farad per gram (F/g).

It is to be understood that electric capacity of the polyaniline obviously exceeds that of the CNTs electric double layer, indicating specific electric capacity of the carbon nanotube/polyaniline composite increasing with the polyaniline mass therein. Specifically, along with the mass percent of polyaniline in carbon nanotube/polyaniline composite materials increasing from 20% to 80%, the specific electric capacity of the carbon nanotube/polyaniline composite materials correspondingly increases from 200 F/g to 600 F/g.

The obtained specific electric capacity of the carbon nanotube/polyaniline composite, qualifies strong applicability as an electrode material applied in the field of capacitors, solar cells, fuel cells, and lithium ion batteries.

Figure 4:
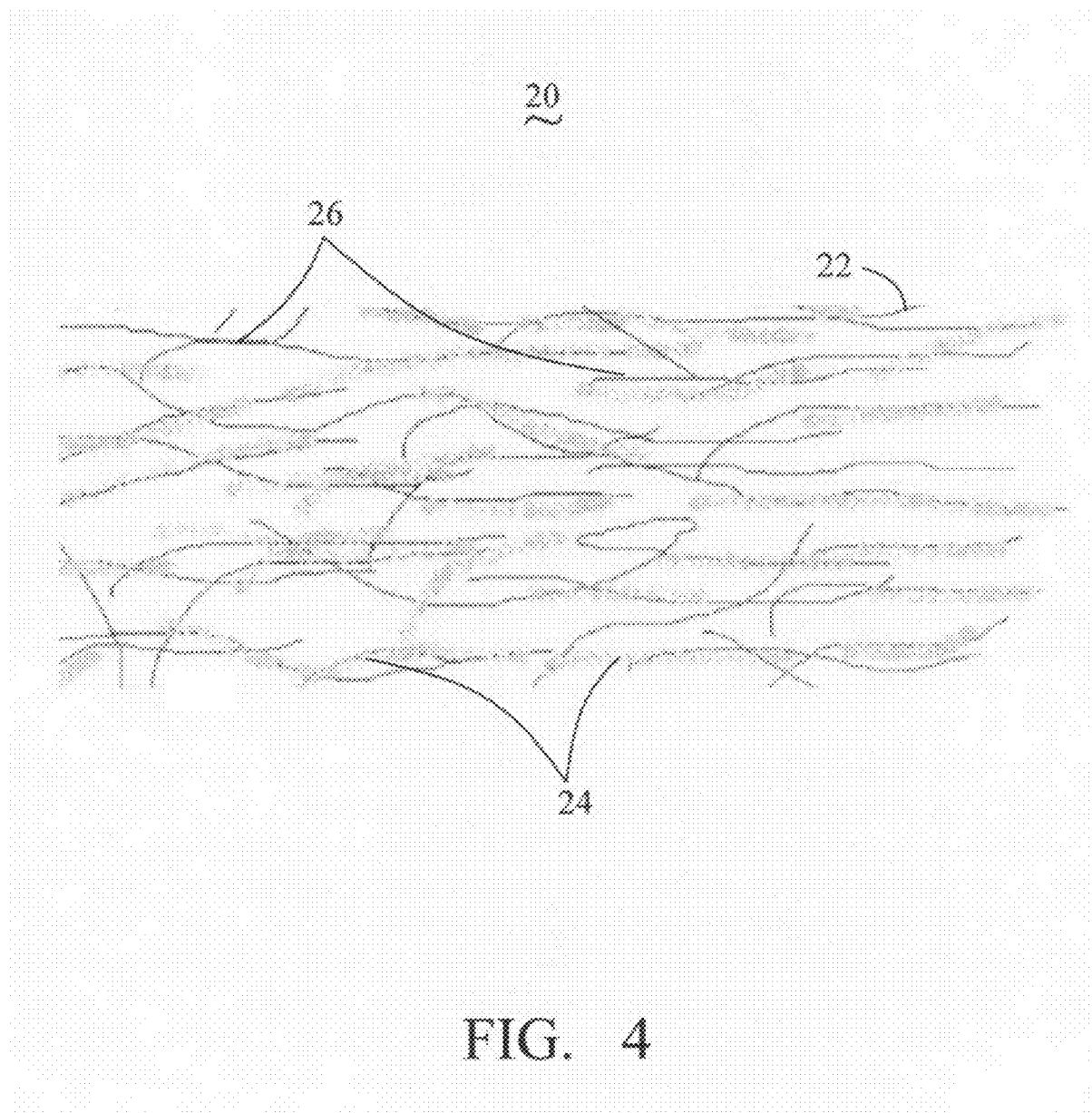
FIG. 4 is a schematic view of a carbon nanotube-conductive polymer composite including ordered CNTs in accordance with a second embodiment.

Referring to FIG. 4, a carbon nanotube-conductive polymer composite 20, according to a second embodiment, is shown. The carbon nanotube-conductive polymer composite 20 includes a number of CNTs 22 and a number of conductive polymer fibers 24. The CNTs are connected with each other to form ordered network 26. The structure of the carbon nanotube-conductive polymer composite 20 differs from the first embodiment only in inclusion here of an ordered carbon nanotube network 26, the CNTs 22 of the ordered carbon nanotube network 26 in one or many orientations according to successively oriented CNTs. The conductive polymer fibers 24 adhere to the ordered carbon nanotube network 26.

Figure 5:
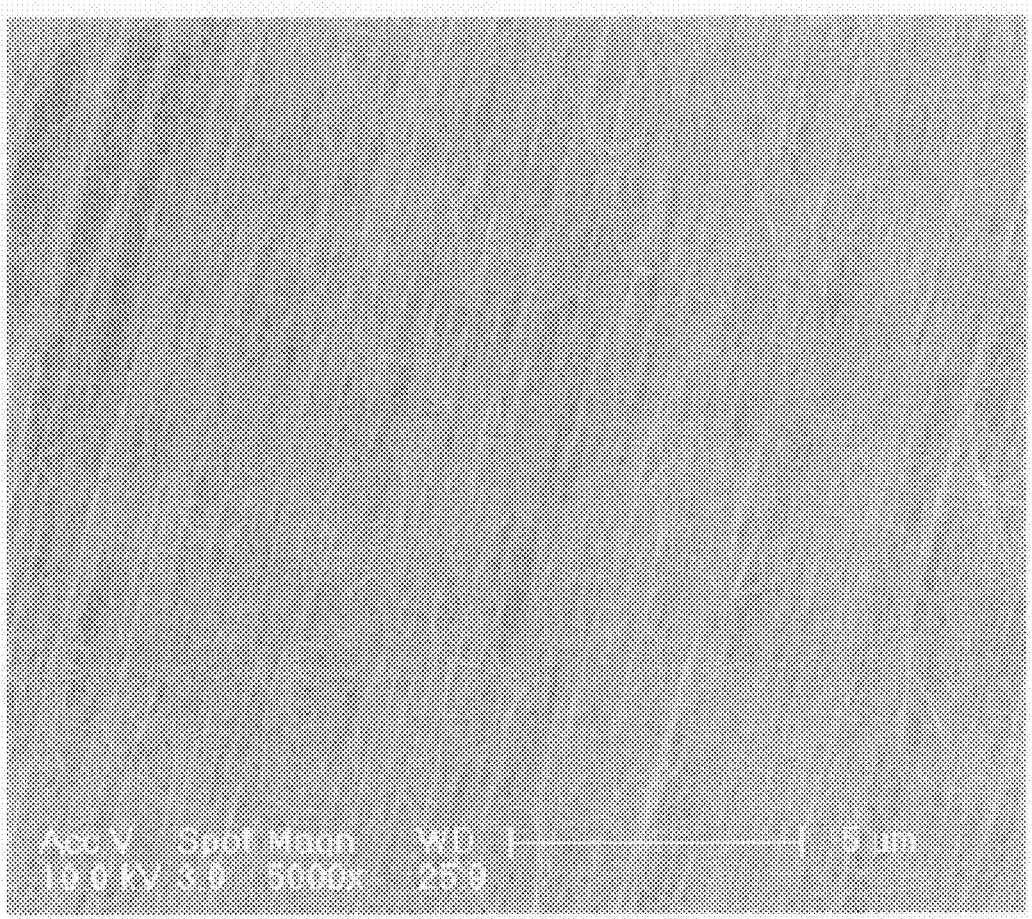
FIG. 5 shows a Scanning Electron Microscope (SEM) image of a carbon nanotube film.

Specifically, the carbon nanotube network is an ordered carbon nanotube layer. This carbon nanotube layer includes at least one ordered carbon nanotube film from which a portion of the CNTs from the array of carbon nanotubes is extracted to form a carbon nanotube film. The ordered carbon nanotube film comprises a plurality of successively oriented carbon nanotubes. The CNTs are parallel and combined by van Der Waals attraction therebetween as shown in FIG. 5. It is to be understood that the CNT layer further includes at least two stacked ordered CNT films. The adjacent two ordered CNT films can be aligned along the same or different orientations. The angle between the aligned direction of adjacent carbon nanotube films is from 0° to about 900. Because the ordered CNT films may be stacked, thickness of the above CNTs layers is not limited, with thickness set according to actual need to arrange the CNT layer.

The disclosed carbon nanotube-conductive polymer composite provides for CNTs connected with each other to form a more uniform network, disordered or ordered, to enhance the specific electric capacity of the carbon nanotube-conductive polymer composite. Further, the carbon nanotube network lowers internal resistances of the carbon nanotube-conductive polymer composite. As well, the carbon nanotube network has superior flexibility, with the ability to be randomly curled and bent, whereby the carbon nanotube-conductive polymer composite composed of the carbon nanotube network also has good flexibility.

Finally, it is to be understood that the embodiments described are intended to illustrate rather than limit the invention. Variations may be made to the embodiments without departing from the spirit of the invention as claimed. The embodiments illustrate the scope of the invention but do not restrict the scope of the invention.

What is claimed is:

1. A carbon nanotube-conductive polymer composite comprising:
    a plurality of carbon nanotubes which form a carbon nanotube network; and
    a plurality of conductive polymer fibers adhered to the carbon nanotube network, wherein the conductive polymer fibers are from about 100 nm to about 10 mm long and wherein the diameters of the conductive polymer fibers are from about 30 nm to about 120 nm.

2. The carbon nanotube-conductive polymer composite as claimed in claim 1, wherein the carbon nanotube network comprises a plurality of disordered carbon nanotubes.

3. The carbon nanotube-conductive polymer composite as claimed in claim 2, wherein the disordered carbon nanotubes are entangled.

4. The carbon nanotube-conductive polymer composite as claimed in claim 2, wherein the disordered carbon nanotubes are attracted by van der Waals force.

5. The carbon nanotube-conductive polymer composite as claimed in claim 1, wherein the carbon nanotube network comprises a plurality of carbon nanotubes oriented along one or more axes.

6. The carbon nanotube-conductive polymer composite as claimed in claim 5, wherein the carbon nanotube network comprises at least one ordered carbon nanotube film.

7. The carbon nanotube-conductive polymer composite as claimed in claim 6, wherein the ordered carbon nanotube film comprises a plurality of successively oriented carbon nanotubes parallel to each other and combined by van der Waals force therebetween.

8. The carbon nanotube-conductive polymer composite as claimed in claim 7, wherein the carbon nanotube network further includes at least two stacked ordered carbon nanotubes films.

9. The carbon nanotube-conductive polymer composite as claimed in claim 8, wherein an angle between the alignment orientations of two adjacent carbon nanotube films is from about 0° to about 90°.

10. The carbon nanotube-conductive polymer composite as claimed in claim 1, wherein the carbon nanotube network comprises a plurality of carbon nanotubes selected from the group consisting of single-walled carbon nanotubes, double-walled carbon nanotubes, and multi-walled carbon nanotubes.

11. The carbon nanotube-conductive polymer composite as claimed in claim 10, wherein the diameter of the single-walled carbon nanotubes is from about 0.5 to about 50 nanometers, diameter of the double-walled carbon nanotubes is about 1 to about 50 nanometers, and diameter of the multi-walled carbon nanotubes is about 1.5 to about 50 nanometers.

12. The carbon nanotube-conductive polymer composite as claimed in claim 1, wherein the lengths of the carbon nanotubes are from about 100 nm to about 10 mm.

13. The carbon nanotube-conductive polymer composite as claimed in claim 1, wherein the conductive polymer fibers comprise a material selected from the group consisting of polyaniline, polypyrrole, polythiophene, polyacetylene, polyparaphenylene, poly phenylene vinylene, and any combination thereof.

14. A carbon nanotube-conductive polymer composite comprising:
    a carbon nanotube framework comprising a plurality of connected carbon nanotubes and a plurality of interspaces substantially uniformly distributed therein; and
    a plurality of conductive polymer fibers substantially uniformly distributed in the interspaces; wherein each of the conductive polymer fibers is attached to a surface of at least one of the carbon nanotubes, wherein the conductive polymer fibers are from about 100 nm to about 10 mm long and wherein the diameters of the conductive polymer fibers are from about 30 nm to about 120 nm.

15. The carbon nanotube-conductive polymer composite as claimed in claim 1, wherein the lengths of the plurality of conductive polymer fibers and the plurality of carbon nanotubes are in the range from about 100 nm to about 10 mm.

16. A carbon nanotube-conductive polymer composite comprising:
    at least one carbon nanotube film comprising a plurality of successively oriented carbon nanotubes which are parallel and combined by van der Waals attraction therebetween; and
    a plurality of conductive polymer fibers adhered to the at least one carbon nanotube film, wherein the conductive polymer fibers are from about 100 nm to about 10 mm long and wherein the diameters of the conductive polymer fibers are from about 30 nm to about 120 nm.

17. The carbon nanotube-conductive polymer composite as claimed in claim 16, wherein the plurality of conductive polymer fibers are adhered to surfaces of the plurality of carbon nanotubes of the at least one carbon nanotube film.

18. The carbon nanotube-conductive polymer composite as claimed in claim 17, wherein the conductive polymer fibers comprise a material selected from the group consisting of polyaniline, polypyrrole, polythiophene, polyacetylene, polyparaphenylene, poly phenylene vinylene, and any combination thereof.

* * * * *